(12) United States Patent
Toorians

(10) Patent No.: US 6,449,682 B1
(45) Date of Patent: Sep. 10, 2002

(54) SYSTEM AND METHOD FOR INSERTING ONE OR MORE FILES ONTO MASS STORAGE

(75) Inventor: Arman Toorians, San Jose, CA (US)

(73) Assignee: Phoenix Technologies Ltd., San Jose, CA (US)

( * ) Notice: Subject to any disclaimer, the term of this patent is extended or adjusted under 35 U.S.C. 154(b) by 0 days.

(21) Appl. No.: 09/336,281

(22) Filed: Jun. 18, 1999

(51) Int. Cl.$^7$ .......................... G06F 9/445; G06F 12/00
(52) U.S. Cl. ........................ 711/100; 717/168; 717/169; 717/171
(58) Field of Search ..................... 711/1, 100; 709/221, 709/222; 713/1, 2, 100; 717/11, 170, 168, 169, 171, 172, 173, 174, 175, 176

(56) References Cited

U.S. PATENT DOCUMENTS

| | | | |
|---|---|---|---|
| 5,121,345 A | 6/1992 | Lentz | 713/2 |
| 5,128,995 A | 7/1992 | Arnold et al. | 713/1 |
| 5,131,089 A | 7/1992 | Cole | 703/24 |
| 5,142,680 A | 8/1992 | Ottman et al. | 717/11 |
| 5,146,568 A | 9/1992 | Flaherty et al. | 709/222 |
| 5,214,695 A | 5/1993 | Arnold et al. | 713/2 |
| 5,274,816 A | 12/1993 | Oka | 713/2 |
| 5,280,627 A | 1/1994 | Flaherty et al. | 713/2 |
| 5,307,497 A | 4/1994 | Feigenbaum et al. | 713/1 |
| 5,325,532 A | 6/1994 | Crosswy et al. | 713/2 |
| 5,379,431 A | 1/1995 | Lemon et al. | 713/2 |
| 5,381,549 A | 1/1995 | Tamura | 713/1 |
| 5,418,918 A | 5/1995 | Vander Kamp et al. | 713/2 |
| 5,444,850 A | 8/1995 | Chang | 709/222 |
| 5,448,740 A | 9/1995 | Oka | 713/2 |
| 5,452,454 A | 9/1995 | Basu | 713/2 |
| 5,463,766 A | 10/1995 | Schieve et al. | 713/2 |
| 5,469,573 A | 11/1995 | McGill, III et al. | 713/100 |
| 5,504,905 A | 4/1996 | Cleary et al. | 713/100 |
| 5,522,076 A | 5/1996 | Dewa et al. | 713/2 |
| 5,526,523 A | 6/1996 | Straub | 713/100 |
| 5,542,082 A | 7/1996 | Solhjell | 713/2 |
| 5,581,740 A | 12/1996 | Jones | 703/25 |
| 5,586,327 A | 12/1996 | Bealkowski et al. | 713/2 |
| 5,594,903 A | 1/1997 | Bunnell et al. | 713/2 |
| 5,604,890 A | 2/1997 | Miller | 703/23 |
| 5,652,868 A | 7/1997 | Williams | 703/23 |
| 5,652,886 A | 7/1997 | Tulpule et al. | 713/2 |
| 5,664,194 A | 9/1997 | Paulsen | 713/2 |
| 5,680,547 A | 10/1997 | Chang | 713/1 |
| 5,692,190 A | 11/1997 | Williams | 713/2 |
| 5,694,583 A | 12/1997 | Williams et al. | 713/12 |
| 5,694,600 A | 12/1997 | Khenson et al. | 713/2 |
| 5,701,477 A | 12/1997 | Chejlava, Jr. | 713/2 |
| 5,715,456 A | 2/1998 | Bennett et al. | 713/2 |
| 5,717,930 A | 2/1998 | Imai et al. | 713/1 |
| 5,727,213 A | 3/1998 | Vander Kamp et al. | 713/2 |
| 5,732,268 A | 3/1998 | Bizzarri | 713/2 |
| 5,748,957 A | 5/1998 | Klein | 713/2 |
| 5,754,853 A | 5/1998 | Pearce | 713/2 |
| 5,764,593 A | 6/1998 | Turpin | 713/2 |
| 5,781,758 A | 7/1998 | Morley | 703/27 |
| 5,790,849 A | 8/1998 | Crocker et al. | 713/2 |
| 5,796,984 A | 8/1998 | Pearce et al. | 703/27 |
| 5,802,363 A | 9/1998 | Williams et al. | 713/2 |
| 5,805,880 A | 9/1998 | Pearce et al. | 713/2 |
| 5,805,882 A | 9/1998 | Cooper et al. | 713/2 |
| 5,815,706 A | 9/1998 | Stewart et al. | 713/2 |
| 5,819,063 A | 10/1998 | Dahl et al. | 703/27 |

(List continued on next page.)

Primary Examiner—Do Hyun Yoo
Assistant Examiner—Yamir Encarnación

(57) ABSTRACT

The present invention relates to a system and method for inserting one or more files onto a mass storage device during a boot sequence. The method includes loading a content module containing at least one file into memory. The method further includes replacing a target module that is typically executed during a boot sequence with a utility module. The method also includes executing the utility module during the boot sequence to move the content module onto a mass storage device.

17 Claims, 7 Drawing Sheets

U.S. PATENT DOCUMENTS

| | | | |
|---|---|---|---|
| 5,828,888 A | 10/1998 | Kozaki et al. | 713/2 |
| 5,832,251 A | 11/1998 | Takahashi | 703/23 |
| 5,842,011 A | 11/1998 | Basu | 713/2 |
| 5,854,905 A | 12/1998 | Garney | 713/2 |
| 5,864,698 A | 1/1999 | Krau et al. | 713/2 |
| 5,887,164 A | 3/1999 | Gupta | 713/2 |
| 5,901,310 A | 5/1999 | Rahman et al. | 713/1 |
| 5,907,679 A | 5/1999 | Hoang et al. | 709/220 |
| 6,272,629 B1 * | 8/2001 | Stewart | 709/222 |
| 6,289,426 B1 * | 9/2001 | Maffezzoni et al. | 711/162 |

* cited by examiner

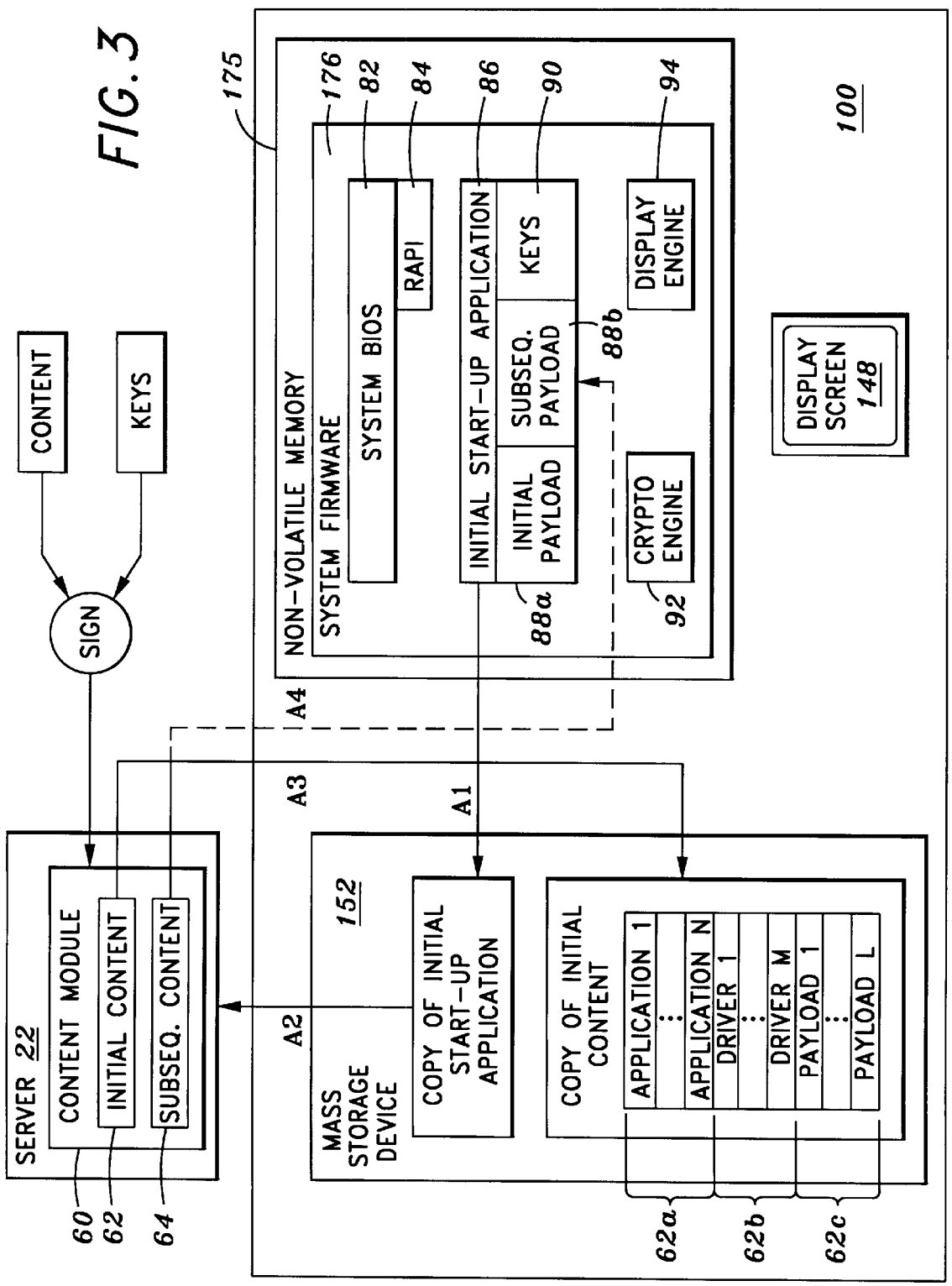

SYSTEM AND METHOD FOR INSERTING ONE OR MORE FILES ONTO MASS STORAGE

BACKGROUND OF THE INVENTION

1. Field of the Invention

The present invention relates to a system and method for inserting one or more files onto a mass storage device during a boot sequence.

2. Description of the Related Art

Inserting files into an NTFS, HPFS, FAT or any other file system without the operating system present is a desired concept. This will allow a system manufacturer to pre-load a computer system with information and files such as drivers, data, system configuration information, patches, messages or any other useful data without the requirement of any running operating system installed in the computer. The file or information will be stored by the manufacturer or third party vendor in the storage that was traditionally dedicated to Basic Input/Output System (BIOS). Then the file or data using the methods in the present invention will be loaded into a mass storage device where the operating system will utilize or execute at a later time.

Accordingly, there is a need to provide a system and method for inserting one or more files onto a mass storage device during a boot sequence.

SUMMARY OF THE INVENTION

The present invention relates to a system and method for inserting one or more files onto a mass storage device during a boot sequence. The method includes loading a content module containing at least one file into memory. The method further includes replacing a target module that is typically executed during a boot sequence with a utility module. The method also includes executing the utility module during the boot sequence to move the content module onto a mass storage device.

BRIEF DESCRIPTION OF THE DRAWINGS

FIG. 3 illustrates a diagram of one embodiment of the computer system of FIG. 2A, in which the apparatus and method of invention is used.

DETAILED DESCRIPTION OF PREFERRED EMBODIMENTS

The present invention provides a system and method for writing files on a mass storage device during a boot sequence.

Definitions

As discussed herein, a "computer system" is a product including circuitry capable of processing data. The computer system may include, but is not limited to, general purpose computer systems (e.g., server, laptop, desktop, palmtop, personal electronic devices, etc.), personal computers (PCs), hard copy equipment (e.g., printer, plotter, fax machine, etc.), banking equipment (e.g., an automated teller machine), and the like. An infomediary is a web site that provides information on behalf of producers of goods and services, supplying relevant information to businesses about products and/or services offered by suppliers and other businesses. Content refers to application programs, driver programs, utility programs, the payload, etc., and combinations thereof, as well as graphics, informational material (such as articles, stock quotes, etc.) and the like, either singly or in any combination. "Payload" refers to messages with graphics or informational material (articles, stock quotes, etc.) and may include files or applications. In one embodiment, it is transferred at a predetermined time to the system's mass storage media. In addition, a "communication link" refers to the medium or channel of communication. The communication link may include, but is not limited to, a telephone line, a modem connection, an Internet connection, an Integrated Services Digital Network ("ISDN") connection, an Asynchronous Transfer Mode (ATM) connection, a frame relay connection, an Ethernet connection, a coaxial connection, a fiber optic connection, satellite connections (e.g. Digital Satellite Services, etc.), wireless connections, radio frequency (RF) links, electromagnetic links, two way paging connections, etc., and combinations thereof.

In addition, the loading of an operating system ("OS") refers to the initial placement of the operating system bootstrap loader. In one embodiment, during the OS load, a sector of information is typically loaded from a hard disk into the system memory. Alternatively, the bootstrap loader is loaded from a network into system memory. An OS "boot" refers to the execution of the bootstrap loader. This places the OS in control of the system. Some of the actions performed during the OS boot include system configuration, device detection, loading of drivers and user logins. OS runtime refers to the completion of the boot phase and the beginning of the execution of applications by the OS. In one embodiment, during OS runtime, the OS interacts with the user to execute and/or run applications. Power On Self Test (POST) refers to the instructions that are executed to configure and test the system hardware prior to loading an OS.

System Overview

A description of an exemplary system, which incorporates embodiments of the present invention, is hereinafter described.

Figure 1:
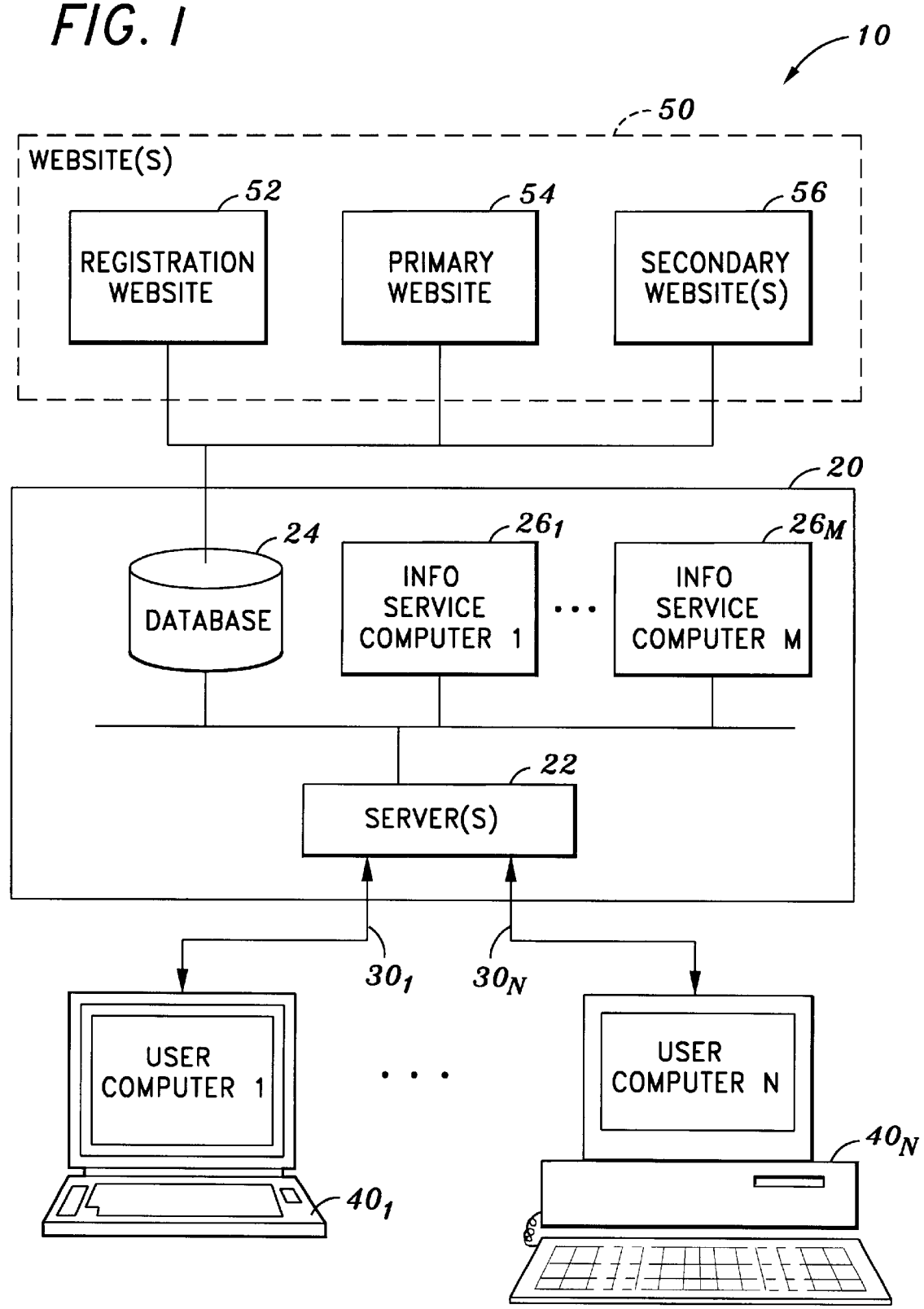
FIG. 1 is a system block diagram of one embodiment of an information distribution system in which the apparatus and method of the invention is used.

FIG. 1 shows a system block diagram of one embodiment of an information distribution system 10 in which the apparatus and method of the invention is used. The system 10 relates to providing an infomediary. It involves the construction and maintenance of a secure and private repository of Internet user and system profiles, collected primarily from warranty service registrations, Internet service registrations, system profiles, and user preferences. Initially, this information is used to register the user with the manufacturers of purchased hardware and software products, and with the providers of on-line or other services. Over time, the user data is used to create a user profile and notify users of relevant software updates and upgrades, to encourage on-line purchases of related products, and to enable one-to-one customized marketing and other services.

In one embodiment, two software modules are used to implement various embodiments of the invention. One is resident on a user's system, and is used to access a predetermined web site. For example, in one embodiment, the operating system and Basic Input and Output System (BIOS) are pre-installed on a computer system, and when the computer system is subsequently first powered up, an application, referred to for discussion purposes as the first software module (in one embodiment, the first software module is the initial start-up application (ISUA), which will be described in the following sections), will allow the launching of one or more executable programs in the pre-boot environment. In one embodiment, the first software module facilitates the launching of one or more executable programs prior to the loading, booting, execution and/or running of the OS. In one embodiment, the user is encouraged to select the use of such a program (i.e., the use of the first software module), and in alternative embodiments, the program is automatically launched. The program(s) contained in the first software module enables tools and utilities to run at an appropriate time, and with proper user authorization, also allow the user to download a second software module that includes drivers, applications and additional payloads through the Internet connection on the PC. The programs may also provide for remote management of the system if the OS fails to launch successfully.

Once the second software module has been delivered, it may become memory resident, and may disable the transferred copy of the first software module. The original copy of the first software module still residing in the system's non-volatile memory remains idle until the second software module fails to function, becomes corrupted or is deleted, upon which a copy of the original first software module is again transferred as described above. The second software module may include an application that connects the user to a specific server on the Internet and directs the user to a predetermined web site to seek authorization to down load further subscription material. The second software module may also include content that is the same or similar to the content of the first software module.

In one embodiment, the system may also include an initial payload that is stored in Read Only Memory BIOS (ROM BIOS). In one embodiment, the initial payload is part of the first software module (e.g., the ISUA). In an alternative embodiment, the initial payload is stored as a module in ROM BIOS, separate from the first software module. In one embodiment, the initial payload is launched from ROM BIOS and displayed on the screen after the Power On Self Test (POST) but prior to the booting, loading and/or execution of the OS. This may occur at a predetermined time, such as when the system is being manufactured, assembled and tested, or when the end user first activates the system. In an alternate embodiment, this initial payload is copied to a predetermined location (such as the system's hard disk) at a predetermined time, such as when the system is being manufactured, assembled and tested, or when the end user first activates the system. Once copied, the payload executes after POST but prior to operation of the OS, and may display graphics, advertisements, animation, Joint Photographic Experts Group (JPEG)/Moving Picture Experts Group (MPEG) formatted material on the screen. When additional programs and/or payloads are delivered (via the Internet or other outside connection), the display screen may be used to provide customized screens in the form of messages or graphics prior to and during booting of the OS. In addition, executable programs delivered in the first software module, as well as subsequent programs (such as the second software module) downloaded from the web site, may be used to survey the PC to determine various types of devices, drivers, and applications installed. In one embodiment, as described in co-pending U.S. patent application ser. No. 09/336,289, entitled "Method and Apparatus for Automatically Installing And Configuring Software on a Computer" filed Jun. 18, 1999, assigned to Phoenix Technologies, Ltd., the contents of which are incorporated herein by reference, the first software module is used to identify and to automatically create shortcuts and/or bookmarks for the user. The programs downloaded from the website may include software that collects and maintains a user profile based on the user's preferences. Such information may be provided to the infomediary, which subsequently forwards portions of the information and/or compiled data based on the information to suppliers and other businesses to obtain updates or revisions of information provided by the suppliers and other businesses.

Referring to FIG. 1, the information distribution system 10 comprises a service center 20 that is connected over one or more communications links $30_1$–$30_N$ to one or more user computer systems $40_1$–$40_N$ ("40"). The service center 20 includes one or more servers 22, one or more databases 24, and one or more computers $26_1$–$26_M$. The one or more computers $26_1$–$26_M$ are capable of simultaneous access by a plurality of the user computer systems $40_1$–$40_N$. If a plurality of computers are used, then the computers $26_1$–$26_M$ may be connected by a local area network (LAN) or any other similar connection technology. However, it is also possible for the service center 20 to have other configurations. For example, a smaller number of larger computers (i.e. a few mainframe, mini, etc. computers) with a number of internal programs or processes running on the larger computers capable of establishing communications links to the user computers.

The service center 20 may also be connected to a remote network 50 (e.g., the Internet) or a remote site (e.g., a satellite, which is not shown in FIG. 1). The remote network 50 or remote site allows the service center 20 to provide a wider variety of computer software, content, etc. that could be stored at the service center 20. The one or more databases 24 connected to the service center computer(s), e.g., computer $26_1$, are used to store database entries consisting of computer software available on the computer(s) 26. In one embodiment, each user computer $40_1$–$40_N$ has its own secure database (not shown), that is not accessible by any other computer. The communication links $30_1$–$30_N$ allow the one or more user computer systems $40_1$–$40_N$ to simultaneously connect to the computer(s) $26_1$–$26_M$. The connections are managed by the server 22.

After a user computer system 40 establishes two-way communications with the information service computer 26, the content is sent to the user computer system 40 in a manner hereinafter described. The downloaded content includes an application that surveys the user and/or the user computer system's hardware and/or software to develop a user profile as well as a profile of the user's system. The information gathered from the user and/or user's computer system is subsequently provided to the service center 20, which provides additional content to the user computer 40 based on the user and system profile. The database entries from the database connected to the service computer 26 contain information about computer software, hardware, and third party services and products that are available to a user. Based on the user and/or system profile, the content is further sent to the user computer for display. The content may also include a summary of information such as the availability of patches and fixes for existing computer software, new versions of existing computer software, brand new computer software, new help files, etc. The content may further include information regarding availability of hardware and third party products and services that is of interest to the user. The user is then able to make one or more choices from the summary of available products and services, and request that the products be transferred from the service computer 26 to the user computer. Alternatively, the user may purchase the desired product or service from the summary of available products and services.

Figure 2:
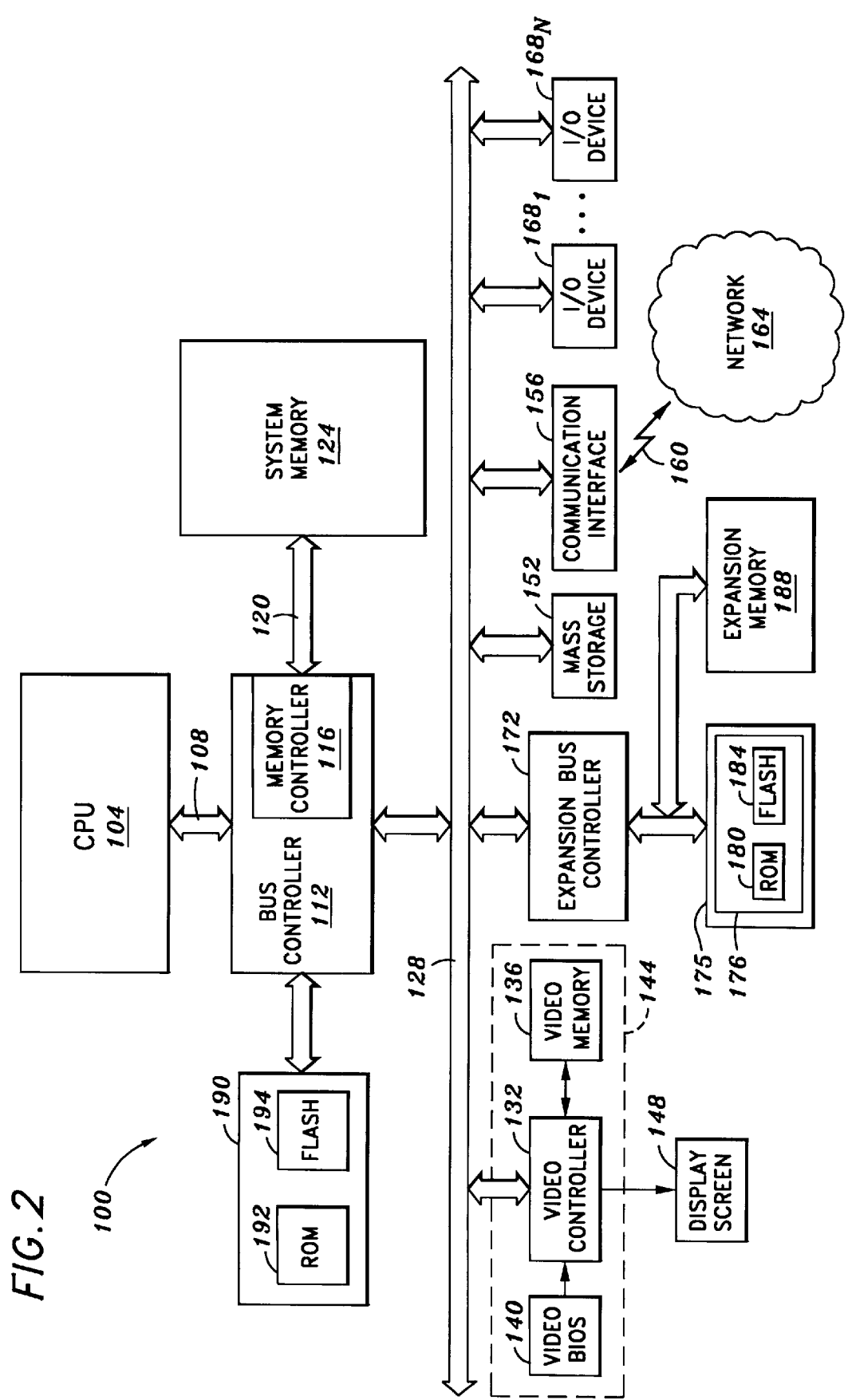
FIG. 2 illustrates an exemplary processor system or user computer system which implements embodiments of the present invention.

FIG. 2 illustrates an exemplary computer system 100 that implements embodiments of the present invention. The computer system 100 illustrates one embodiment of user computer systems $40_1$–$40_N$ and/or computers $26_1$–$26_M$ (FIG. 1), although other embodiments may be readily used.

Referring to FIG. 2, the computer system 100 comprises a processor or a central processing unit (CPU) 104. The illustrated CPU 104 includes an Arithmetic Logic Unit (ALU) for performing computations, a collection of registers for temporary storage of data and instructions, and a control unit for controlling operation for the system 100. In one embodiment, the CPU 104 includes any one of the x86, Pentium™, Pentium II™, and Pentium Pro™ microprocessors as marketed by Intel™ Corporation, the K-6 microprocessor as marketed by AMD™, or the 6x86MX microprocessor as marketed by Cyrix™ Corp. Further examples include the Alpha™ processor as marketed by Digital Equipment Corporation™, the 680X0 processor as marketed by Motorola™; or the Power PC™ processor as marketed by IBM™. In addition, any of a variety of other processors, including those from Sun Microsystems, MIPS, IBM, Motorola, NEC, Cyrix, AMD, Nexgen and others may be used for implementing CPU 104. The CPU 104 is not limited to microprocessor but may take on other forms such as microcontrollers, digital signal processors, reduced instruction set computers (RISC), application specific integrated circuits, and the like. Although shown with one CPU 104, computer system 100 may alternatively include multiple processing units.

The CPU 104 is coupled to a bus controller 112 by way of a CPU bus 108. The bus controller 112 includes a memory controller 116 integrated therein, though the memory controller 116 may be external to the bus controller 112. The memory controller 116 provides an interface for access by the CPU 104 or other devices to system memory 124 via memory bus 120. In one embodiment, the system memory 124 includes synchronous dynamic random access memory (SDRAM). System memory 124 may optionally include any additional or alternative high speed memory device or memory circuitry. The bus controller 112 is coupled to a system bus 128 that may be a peripheral component interconnect (PCI) bus, Industry Standard Architecture (ISA) bus, etc. Coupled to the system bus 128 are a graphics controller, a graphics engine or a video controller 132, a mass storage device 152, a communication interface device 156, one or more input/output (I/O) devices $168_1$–$168_N$, and an expansion bus controller 172. The video controller 132 is coupled to a video memory 136 (e.g., 8 Megabytes) and video BIOS 140, all of which may be integrated onto a single card or device, as designated by numeral 144. The video memory 136 is used to contain display data for displaying information on the display screen 148, and the video BIOS 140 includes code and video services for controlling the video controller 132. In another embodiment, the video controller 132 is coupled to the CPU 104 through an Advanced Graphics Port (AGP) bus.

The mass storage device 152 includes (but is not limited to) a hard disk, floppy disk, CD-ROM, DVD-ROM, tape, high density floppy, high capacity removable media, low capacity removable media, solid state memory device, etc., and combinations thereof. The mass storage device 152 may include any other mass storage medium. The communication interface device 156 includes a network card, a modem interface, etc. for accessing network 164 via communications link 160. The I/O devices $168_1$–$168_N$ include a keyboard, mouse, audio/sound card, printer, and the like. The I/O devices $168_1$–$168_N$ may be a disk drive, such as a compact disk drive, a digital disk drive, a tape drive, a zip drive, a jazz drive, a digital video disk (DVD) drive, a solid state memory device, a magneto-optical disk drive, a high density floppy drive, a high capacity removable media drive, a low capacity media device, and/or any combination thereof. The expansion bus controller 172 is coupled to nonvolatile memory 175 which includes system firmware 176. The system firmware 176 includes system BIOS 82, which is for controlling, among other things, hardware devices in the computer system 100. The system firmware 176 also includes ROM 180 and flash (or EEPROM) 184. The expansion bus controller 172 is also coupled to expansion memory 188 having RAM, ROM, and/or flash memory (not shown). The system 100 may additionally include a memory module 190 that is coupled to the bus controller 112. In one embodiment, the memory module 190 comprises a ROM 192 and flash (or EEPROM) 194.

As is familiar to those skilled in the art, the computer system 100 further includes an operating system (OS) and at least one application program, which in one embodiment, are loaded into system memory 124 from mass storage device 152 and launched after POST. The OS may include any type of OS including, but not limited or restricted to, DOS, Windows™ (e.g., Windows 95™, Windows 98™, Windows NT™), Unix, Linux, OS/2, OS/9, Xenix, etc. The operating system is a set of one or more programs which control the computer system's operation and the allocation of resources. The application program is a set of one or more software programs that performs a task desired by the user.

In accordance with the practices of persons skilled in the art of computer programming, the present invention is described below with reference to symbolic representations of operations that are performed by computer system 100, unless indicated otherwise. Such operations are sometimes referred to as being computer-executed. It will be appreciated that operations that are symbolically represented include the manipulation by CPU 104 of electrical signals representing data bits and the maintenance of data bits at memory locations in system memory 124, as well as other processing of signals. The memory locations where data bits are maintained are physical locations that have particular electrical, magnetic, optical, or organic properties corresponding to the data bits.

When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

FIG. 3 illustrates a logical diagram of computer system 100. Referring to FIGS. 2 and 3, the system firmware 176 includes software modules and data that are loaded into system memory 124 during POST and subsequently executed by the processor 104. In one embodiment, the system firmware 176 includes a system BIOS module 82 having system BIOS handlers, hardware routines, etc., a ROM application program interface (RAPI) module 84, an initial start-up application (ISUA) module 86, an initial payload 88a, cryptographic keys 90, a cryptographic engine 92, and a display engine 94. The aforementioned modules and portions of system firmware 176 may be contained in ROM 180 and/or flash 184. Alternatively, the aforementioned modules and portions of system firmware 176 may be contained in ROM 190 and/or flash 194. The RAPI 84, ISUA 86, and initial payload 88 may each be separately developed and stored in the system firmware 176 prior to initial use of the computer system 100. In one embodiment, the RAPI 84, ISUA 86, and initial payload 88a each includes proprietary software developed by Phoenix Technologies, Ltd. RAPI 84 generally provides a secured interface between ROM application programs and system BIOS 82. One embodiment of RAPI 84 is described in co-pending U.S. patent application Ser. No. 09/336,889 entitled "System and Method for Securely Utilizing Basic Input and Output System (BIOS) Services," filed on Jun. 18, 1999, now U.S. Pat. No. 6,148,387 assigned to Phoenix Technologies, Ltd., and which is incorporated herein by reference. One embodiment of ISUA 86 is described in co-pending U.S. patent application Ser. No. 09/336,289 entitled "Method and Apparatus for Automatically Installing and Configuring Software on a Computer," filed on Jun. 18, 1999, assigned to Phoenix Technologies, Ltd., and which is incorporated herein by reference.

Figure 4A:
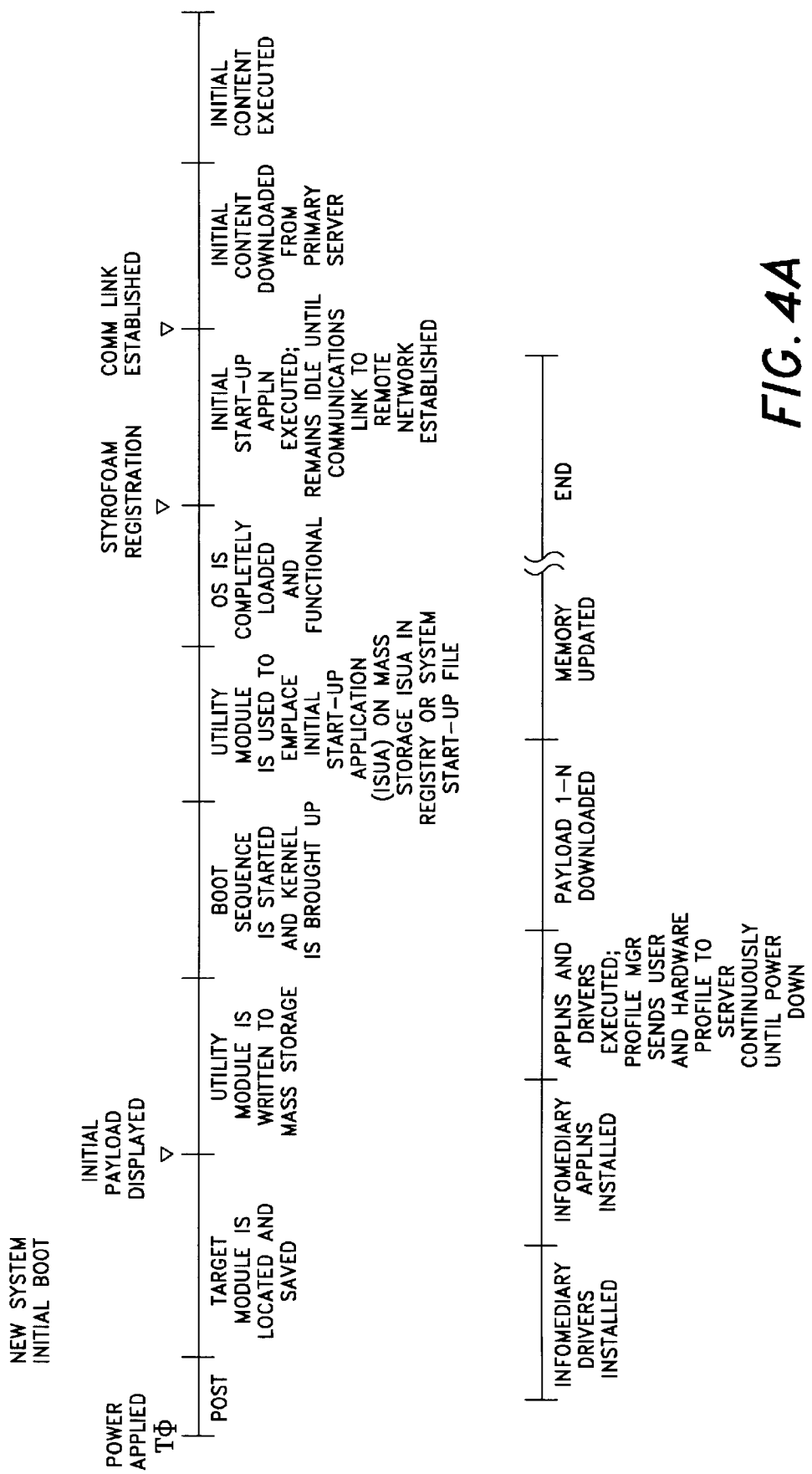
FIGS. 4A and 4B illustrate one embodiment of a system process flow chart provided in accordance with the principles of the invention.
Figure 4B:
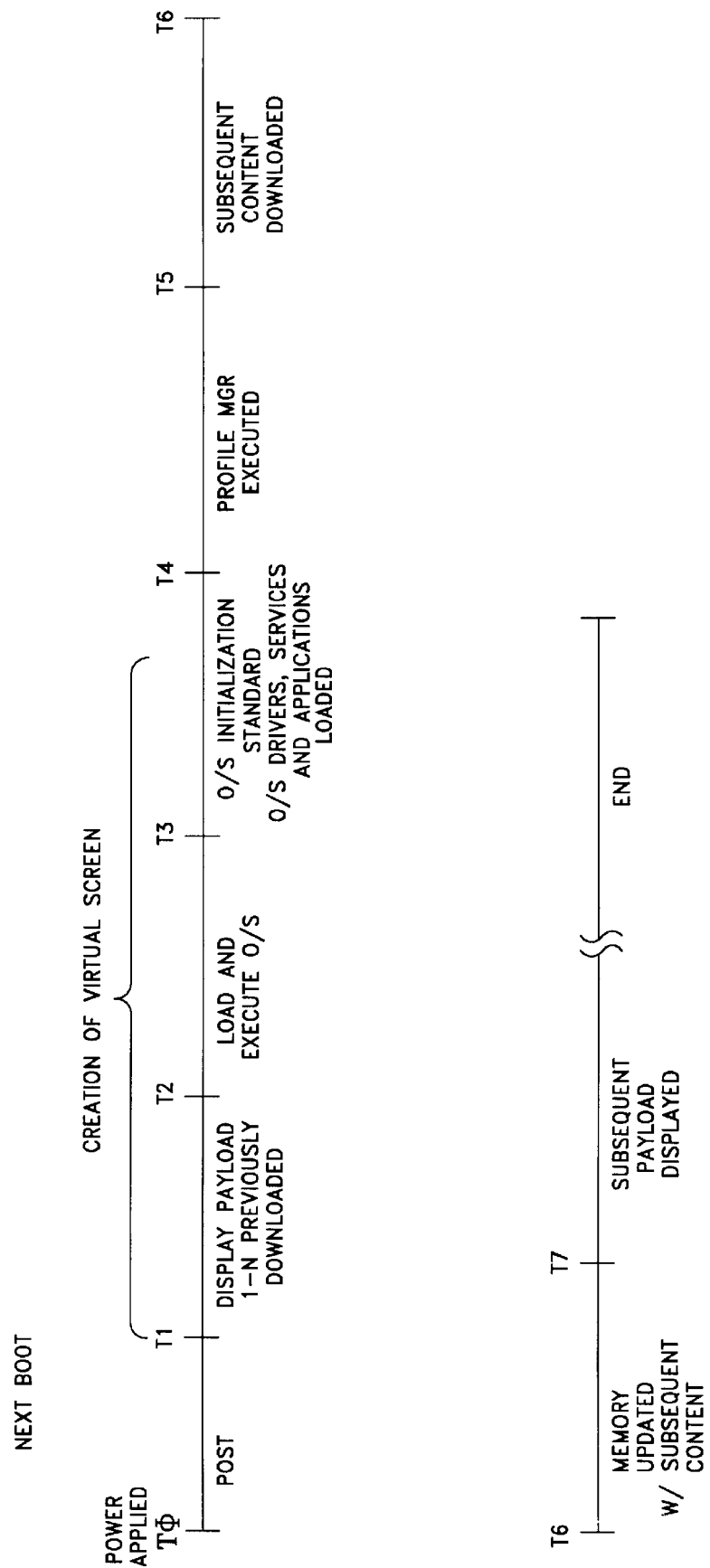

In one embodiment, as shown in FIGS. 3 and 4A and 4B, after power is initially turned on to a new computer system 100, the system commences with POST procedures. During the initial POST, the ISUA 86 is transferred to the mass storage device 152, as shown by A1. One embodiment for transferring the initial payload is described below in more details in FIGS. 5 and 6 and the accompanying text.

In an alternative embodiment, such a transfer is made during the manufacturing and/or assembly process, when the system 100 is first powered up after the operating system has been installed (but prior to loading and running the operating system). In another alternative embodiment, such a transfer may be made after the manufacturing and/or assembly process, after the user receives and powers up the system 100. In a further alternate embodiment, during the transfer of the ISUA 86, additional programs, applications, drivers, data, graphics and other information may also be transferred (for example, from ROM) to the mass storage device 152. For example, the transfer may include the transfer of the initial payload 88a to the mass storage device 152, subsequent to which the initial payload is delivered from the mass storage device 152. Alternatively, the initial payload may be delivered from the ROM. One embodiment of the system and process for facilitating such a transfer is described in co-pending U.S. patent application Ser. No. 09/336,067, entitled "System and Method for Transferring an Application Program from System Firmware to a Storage Device" filed on Jun. 18, 1999, which is assigned to Phoenix Technologies, Ltd., the contents of which are incorporated herein by reference. Alternative embodiments of the system and process for facilitating such a transfer are described in co-pending U.S. patent application Ser. No. 09/272,859, entitled "Method and Apparatus for Providing Memory-based Device Emulation" filed on Mar. 19, 1999, and in co-pending U.S. Patent Continuation-in-Part Application Ser. No. 09/336,307, entitled "Method and Apparatus for Providing Memory-Based Device Emulation" filed on Jun. 18, 1999, each of which is assigned to Phoenix Technologies, Ltd., the assignee of the present invention, the contents of each of which are incorporated herein by reference.

In one embodiment, the ISUA 86 is a computer software executable program that will determine if there are preinstalled programs that are resident on the end user's system. If so, it will identify those preinstalled programs and create shortcuts (on the desktop in the case of a Windows operating system), or bookmarks, to allow the user to automatically launch the programs. In this embodiment, the executable program is also capable of initiating and establishing two-way communications with one or more applications on the server 22 and/or any one of the service computers 26 (FIG. 1), as described below. Moreover, in one embodiment, graphical content of the initial payload 88a is displayed on the user's display screen 148 during POST. Alternatively, the graphical content of the initial payload 88a may be displayed after a subsequent booting process. For example, as part of the user's profile as described below, the user may be asked if he or she would like to obtain additional information regarding one or more products and/or services. If the user so desires, content regarding the desired products and/or services will be displayed during subsequent boot processes.

As shown in FIG. 4A, a series of events occurs after POST is completed to load the OS and to emplace the ISUA 86. These events will be described below in more details below in FIGS. 5 and 6 and the accompanying text. After the OS, including OS drivers and services, is completely loaded and functional, the user is then prompted to enter registration information including demographic information such as age, gender, hobbies, etc. In addition, the ISUA 86 is executed, and runs in the background, remaining idle until it detects a communication link established between the computer system 100 and a remote server (e.g., server 22 of FIG. 1) over Network 164 of FIG. 2 (e.g., over the Internet). It should be noted that although the ISUA 86 is shown as being stored in system firmware 176, it may alternatively be located in system memory 124, memory module 790, mass storage 152, any of the I/O devices 168, or provided via communication interface 156.

In one embodiment, the ISUA 86 may search through the operating system to determine if there are applications that have been pre-loaded and pre-installed onto the system. If so, the ISUA 86 may automatically provide short cuts and/or bookmarks for the applications to launch into a predetermined server once the communication link is established. This communication link can be established with a network protocol stack, (e.g. TCP/IP) through sockets, or any other two-way communications technique known in the art. Once the communication link 30 is established, the ISUA 86 issues a request signal to the server 22 (as shown by A2) to download an initial content package 62 from a content module 60. Responsive to the request, the server downloads the initial content package 62 (as shown by A3), which, in one embodiment, is stored in the mass storage device 152. In one embodiment, the initial content 62 and subsequent content 64 may be developed separately, and each is encrypted and/or digitally signed using encryption keys, prior to storing of the initial content 62 and subsequent content 64 on the server 22. When the initial content 62 and/or subsequent content 64 is/are subsequently downloaded into system 100, the crypto engine 92 will use keys 90 to decrypt the initial content 62 and/or subsequent content 64.

As discussed earlier, the initial content package 62 may include applications 62a, drivers 62b, and payloads 62c. In one embodiment, the applications 62a include a data loader application and a profile manager application. The data loader application functions in the same or a similar manner as ISUA 86, and once downloaded, disables and replaces the ISUA 86. More specifically, the data loader application is a computer software program which is also capable of initiating, establishing, and terminating two-way communications between the server 22 and the computer system 100. The data loader application also provides traffic control management between the server 22 and computer system 100, as well as other functions to facilitate communication between the end user's system and the designated server, and content downloading to the end user's system.

The profile manager obtains the user and system profiles of the computer system 100 based on user preferences, system hardware, and software installed at the computer system 100. Upon obtaining the user and system profile of the computer system 100, the profile manager application forwards the results to the data loader application, which subsequently provides the information to the server 22, which matches the user indicted preferences with database 24 (FIG. 1). The results may be forwarded at predetermined intervals or at the user's request. The server 22 then processes the user profile or demographic data and targets content to the users which have similar profiles. In addition, the user profile data of a plurality of users are compiled on the server 22 and aggregated to create an aggregate user profile model. Content is then transmitted to user computer system's based on the user profile data and/or the aggregate user profile model (as shown by A4). The subsequent content 64 is downloaded and stored in system firmware 176, designated by numeral 88b. In one embodiment, the subsequent content 64 is stored in non-volatile memory such as flash or EEPROM, with the loading of the subsequent content being done by reflashing the ROM, as is well known by those skilled in the art. The subsequent content 64 may also be stored as one or more files on mass storage device 152 or may be used to modify the Windows™ system file (under the Windows™ environment). The profile collection process is continued as long as the computer system 100 is activated. In one embodiment, content may be downloaded after the user's profile is received and analyzed at the server 22.

When the computer system 100 is subsequently powered up (see FIG. 4B), the system again performs POST. The content that was previously downloaded and stored in system firmware 176, and subject to copyright issues being resolved, is then displayed, prior to loading and/or execution of the operating system. In the Windows™ environment, the Windows™ logo, which is displayed during the initial loading of the operating system, is subsequently replaced by one or more screen that display the previously downloaded content stored in system firmware 176.

In the case of storing the content as one or more files on the mass storage device 152, as opposed to reflashing the ROM, the Windows™ logo file, which is displayed during boot-up and shutdown, may be altered or replaced. One embodiment utilizing this approach involves replacing the corresponding Windows™ system files with the one or more files showing the content (e.g., a graphic file), as described in co-pending U.S. patent application Ser. No. 09/336,003, entitled "Displaying Images during Boot-up and Shutdown" filed on Jun. 18, 1999, now U.S. Pat. No. 6,373,498 which is assigned to Phoenix Technologies, LTD., the contents of which are incorporated herein by reference. The boot-up Windows display file is named LOGO.SYS and is usually located in the Windows directory. First the Windows™ LOGO.SYS file is transferred from the Windows directory to another directory. Then, the content graphics file is renamed as LOGO.SYS and is transferred to the Windows™ directory. The operating system retrieves this file when the operating system is first launched, and hence the content is displayed on the display screen. Windows™ expects the LOGO.SYS file to be a bit-mapped file with resolution 320×400 and 256 colors although Windows™ will later stretch the resolution to 640×400 for displaying purposes. Therefore, the content graphics file is to be the same graphics format (usually named with the extension "BMP" before being renamed to LOGO.SYS).

The operating system is then loaded, executed, and initialized. The standard operating system drivers and applications are also loaded. The profile manager is then executed. When a link has been established with the predetermined web site, additional content may be downloaded and subsequently displayed. Such additional content are either provided arbitrarily or provided based on the information obtained from a survey of the user or the user's system. In one embodiment, once the boot process is completed, a portion of the display screen may be used to provide icons or shortcuts that are used to access detailed information regarding the previously displayed messages or advertisements. In a further embodiment, the messages or advertisements may again be displayed during the shut-down process, for example, replacing the screen display that displays the message "Windows is shutting down" or "It is now safe to turn off your computer" with other selected content.

Transferring Files from Memory to Mass Storage During a Boot Sequence

Figure 5:
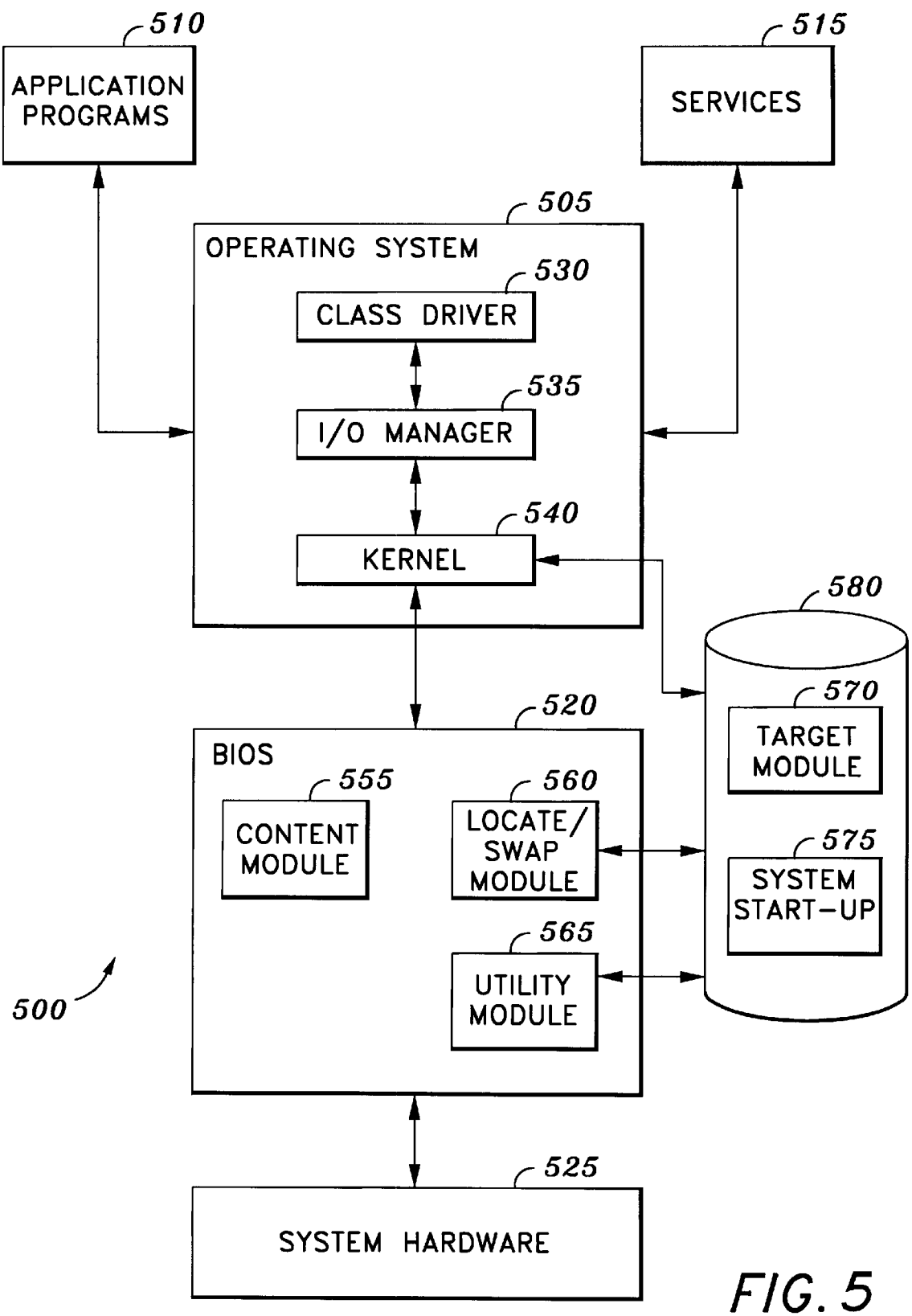
FIG. 5 is an overall functional block diagram illustrating the architecture of one exemplary processing system 500 utilizing the system and method of the present invention.

One embodiment of a system and method for writing files on a mass storage device during a boot sequence in accordance with the current invention will now be described. FIG. 5 is an overall functional block diagram illustrating the architecture of one exemplary processing system 500 utilizing the system and method of the present invention. The processing system 500 comprises an operating system 505 which supports application programs 510 and services 515, Basic Input/Output System (BIOS) 520 and system hardware 525. BIOS 520 is generally a collection of drivers, or software interfaces for hardware devices such as the console (keyboard and display), a generic printer, the auxiliary device (serial port), the computer's clock and the boot disk device. BIOS 520 is typically embedded in non-volatile memory.

The operating system 505 includes a class driver 530 which interfaces with application programs 510 and services 515, and an I/O Manager 535. The I/O Manager 535 converts I/O requests from application programs 510 and services 515 (made via class driver 530) into properly sequenced calls to various driver routines located in the kernel 540. In particular, when the I/O Manager 535 receives an I/O request, it uses the function codes of the request to call one of several dispatch routines in a driver located in the kernel 540. The kernel 540 provides hardware-independent functions, called system functions, that are accessed by means of a software interrupt. The functions provided by the kernel 540 typically include file and directory management, memory management, character device input/output and time and date support, among others. In one embodiment, the operating system 505 a Windows operating system. In alternate embodiments, the operating system 505 includes the Solaris or the AIX operating systems or the like.

BIOS 520 includes a content module 555, which is generally a collection of executable and/or data files which are to be written on a mass storage device 580 when the boot sequence is completed. In one embodiment, the content module 555 may be the Initial Start-Up Application (ISUA) as shown in FIGS. 3 and 4 and as described above. As shown in FIG. 5, the content module 555 is stored in BIOS memory. In practice, the content module 555 may be stored in non-volatile memory (e.g., ROM, flash ROM, or battery backed SRAM) that it is accessible by BIOS 520 upon power up and prior to the start of the boot sequence.

BIOS 520 also includes a locate/swap module 560 capable of at least the following functions: (1) performing reading and writing of information to the mass storage device 570, and (2) locating any file at the root directory level of the mass storage device 570. BIOS 520 further includes a utility module 565 that is capable of (1) moving files to the mass storage device from memory accessible by BIOS 520, and (2) inserting commands into a system start-up or registry file 575 to automatically start up executable files in the content module 555.

The mass storage device 580 includes a target module 570 and a system startup or registry file 575. The target module 570 is typically a file that is executed by the operating system 505 soon after the kernel 540 is operational. For example, in the Windows NT operating system, an exemplary target module would be "SMSS.EXE". The system start-up file or registry 575 is generally a file containing commands to automatically start up applications or executable files after the operating system is fully loaded and operational. For example, in the Windows environment, a system start-up file 575 could be either the Windows Registry or "AUTOEXEC.BAT". It should be noted that one skilled in the art would be able to easily determine different target modules as well as system start-up files for different operating systems.

Figure 6:
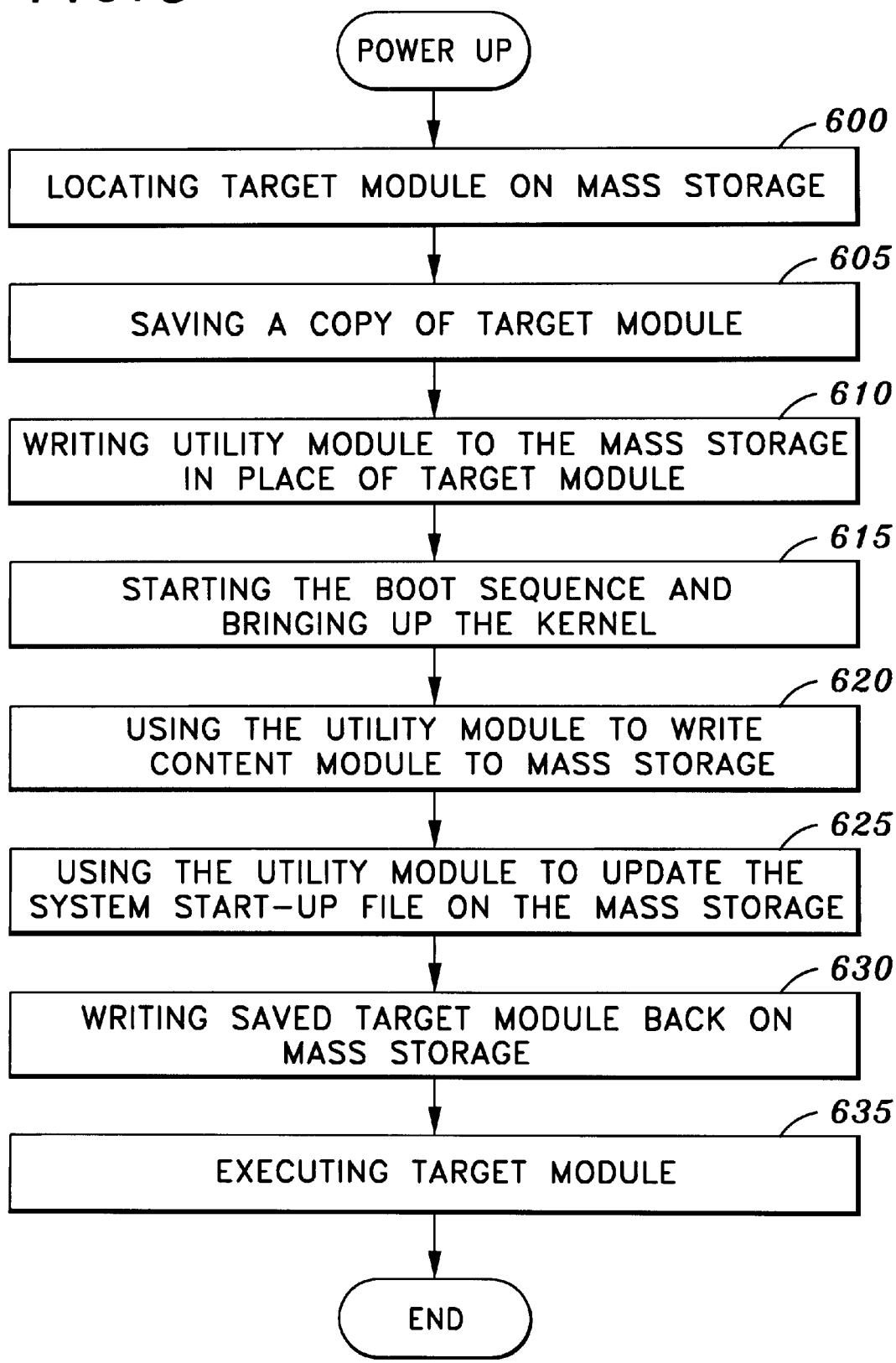
FIG. 6 outlines the sequence of events in accordance with one embodiment of the present invention.

FIG. 6 outlines the sequence of events in accordance with one embodiment of the present invention. After power up and before the start of the boot sequence, the locate/swap module finds the location of the target module on the mass storage device (block 600). Once it finds the location of the target module, the locate/swap module saves the target module into memory or into an unused file that resides in the same directory or area of the disk (block 605). The locate/swap module then writes the utility module on the mass storage device in place of the target module (block 610). It is important to note that the utility module is written to the mass storage device under the same name as the target module and at the same space where the target module resides. For example, in the Windows NT environment, the locate/swap module writes the utility module to the mass storage device as "SMSS.EXE". As stated above, "SMSS.EXE" is a file which the Windows NT operating system executes after its kernel is brought up.

Following the swapping of files (block 610), the boot sequence starts, and the kernel is brought up (block 615). After the kernel is brought up and is operational, the utility module is executed because it is written to the mass storage device under the name of the target module which the operating system normally executes after the kernel is operational (blocks 620 and 625). First, the utility module writes the content module to the mass storage device (block 620). Afterward, the utility module inserts commands into the system start up file or the registry to automatically start up executable files in the content module once the OS is fully loaded and operational (block 625). The utility module then restores the target module by moving the saved target module back onto the mass storage device at the location where the target module resides prior being replaced with the utility module (block 630). Then the target module is executed (block 635) and the operating system continues as usual.

At this stage, the content module has been written to the mass storage device. Furthermore, the system start-up file or the registry contains commands to automatically start up executable files in the content module. As stated above, the system start-up file or registry 575 is generally a file containing commands to automatically start up applications or executable files after the operating system is loaded and operational. Accordingly, executable files in the content module are automatically started up following each subsequent boot sequence.

As stated above, the content module may be the Initial Start-Up Application (ISUA) 86 in one embodiment, as shown in FIGS. 3 and 4A. In this embodiment, the content module is used to launch one or more executable programs. However, there are other ways to use the present invention. For example, in using the present invention, a computer system may be preloaded with information and files containing drivers, system configuration information, patches, messages or other useful data or code without requiring installing and running an operating system in the computer system. Accordingly, valuable time and resources could be saved. Furthermore, production costs may be decreased, thereby reducing costs to consumers and perhaps even increasing profit margin for retailers.

Although the present invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A system for inserting files onto a mass storage device, comprising:

a target module that is typically executed during a boot sequence;

a content module including at least one file;

a utility module to move the content module onto a mass storage device; and a locate/swap module to replace the target module with the utility module so that the utility module is executed during the boot sequence to move the content module onto the mass storage device, wherein said locate/swap module saves a copy of the target module prior to replacing the target module with the utility module.

2. The system of claim 1, wherein the content module includes at least one executable file.

3. The system of claim 1, wherein the content module includes at least one data file.

4. The system of claim 1, wherein the content module is loaded in memory prior to starting the boot sequence.

5. The system of claim 1, wherein the utility module is capable of performing at least the following functions: moving files from memory to the mass storage device, and inserting commands into a system start-up file.

6. The system of claim 1, wherein the utility module inserts commands into a system start-up file so that executable files in the content module are automatically started after an operating system is loaded and operational.

7. The system of claim 1, wherein the utility module places the target module onto the mass storage after moving the content module onto the mass storage so that the target module can be executed.

8. The system of claim 1, wherein the load/swap module is capable of performing at least the following functions: reading and writing information to the mass storage device, and locating file at a root level of the mass storage device.

9. A system for transferring files onto a mass storage device, comprising:

a target module that is typically executed during a boot sequence;

an initial start-up application (ISUA) to allow automatic launching of preinstalled programs;

a utility module to move the ISUA onto a mass storage device; and a locate/swap module to replace the target module with the utility module so that the utility module is executed during the boot sequence to move the ISUA onto the mass storage device, wherein the load/swap module saves a copy of the target module prior to replacing the target module with the utility module.

10. The system of claim 9, wherein the ISUA searches for pre-loaded and pre-installed applications and creates short cuts to launch those applications.

11. The system of claim 9, wherein the ISUA is loaded in memory prior to starting the boot sequence.

12. The system of claim 9, wherein the utility module inserts commands into a system start-up file so that the ISUA is automatically started after an operating system is loaded and operational.

13. The system of claim 9, wherein the utility module places the target module onto the mass storage after moving the ISUA onto the mass storage so that the target module can be executed.

14. A method for transferring files onto a mass storage device, comprising:

loading a content module including at least one file into memory;

replacing a target module that is typically executed during a boot sequence with a utility module;

executing the utility module during the boot sequence to move the content module onto a mass storage device; and saving a copy of the target module prior to replacing the target module with a utility module.

15. A method of claim 14, further comprising:

writing the saved target module back onto the mass storage device after moving the content module on the mass storage.

16. A method of claim 14, further comprising:

inserting commands into a registry to automatically start up executable files in the content module.

17. A method of claim 14, further comprising:

inserting commands into a system start-up file to automatically start up executable files in the content module.

* * * * *